| United States Patent [19] | [11] 3,846,381 |
| --- | --- |
| Kwok | [45] Nov. 5, 1974 |

[54] IMPROVED PROCESS FOR CONTINUOUSLY PRODUCING POLYHEXAMETHYLENE ADIPAMIDE BY CARRYING OUT WATER REMOVAL STEP IN A FORMIC ACID VAPOR CONTAINING ATMOSPHERE

[75] Inventor: Wo Kong Kwok, Wilmington, Del.

[73] Assignee: E. I. du Pont de Nemours and Company, Wilmington, Del.

[22] Filed: May 16, 1973

[21] Appl. No.: 360,922

[52] U.S. Cl. ............................................. 260/78 R
[51] Int. Cl. .......................................... C08g 20/20
[58] Field of Search ................................. 260/78 R

[56] References Cited
UNITED STATES PATENTS

| 3,218,297 | 11/1965 | Sovereign | 260/78 R |
| 3,501,441 | 3/1970 | Brignee | 260/78 R |

*Primary Examiner*—Harold D. Anderson

[57] ABSTRACT

An improvement in the process of continuously preparing polyamides by polymerizing a polyamide-forming composition containing adipic acid and passing the molten polyamide so formed to a vessel where water is removed. The improvement lies in carrying out the water removal step in an atmosphere containing formic acid vapor. The presence of the vapor reduces the rate of detrimental build up of intractable gel deposits in the vessel.

2 Claims, 2 Drawing Figures

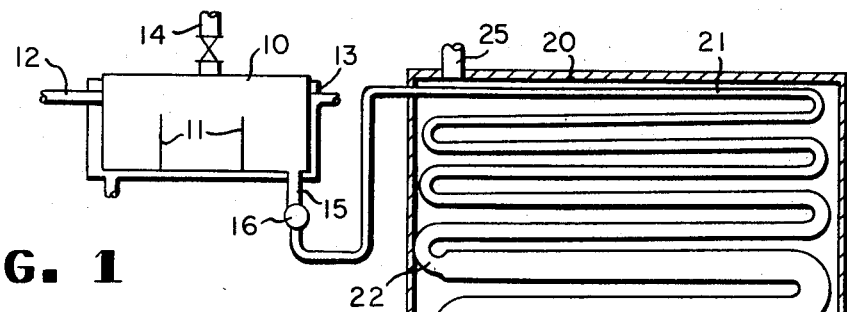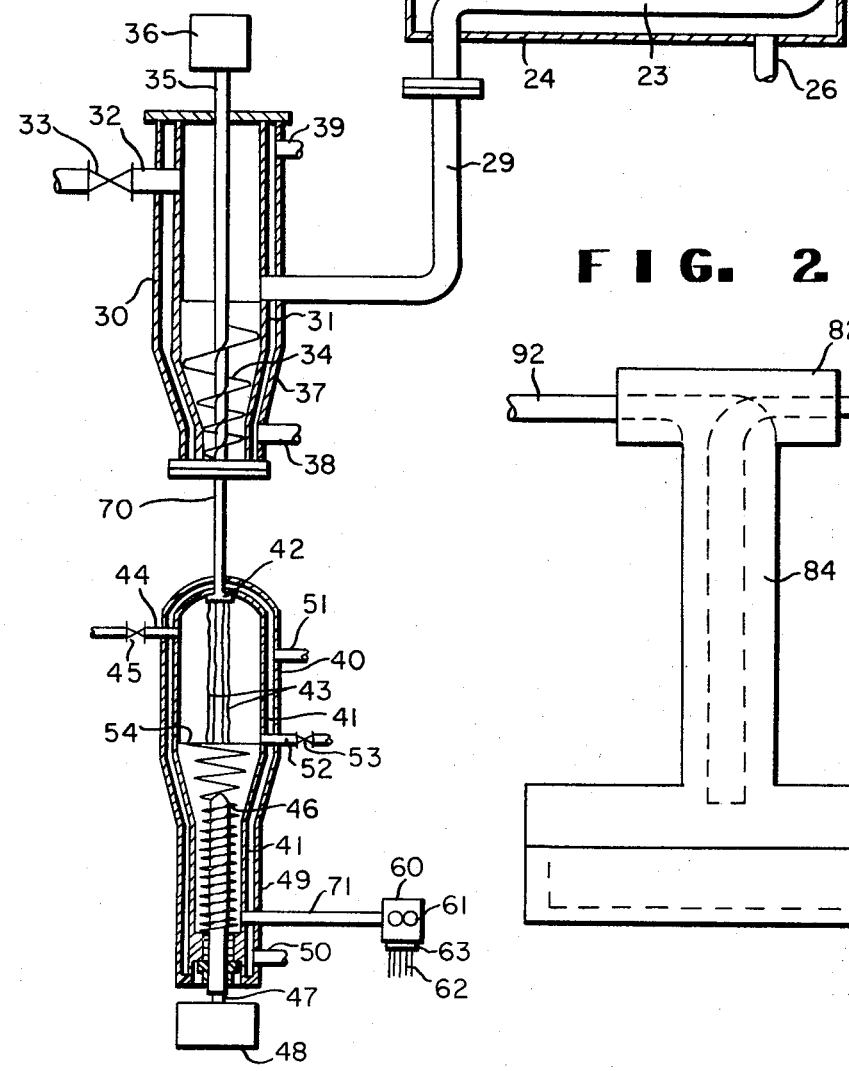

IMPROVED PROCESS FOR CONTINUOUSLY PRODUCING POLYHEXAMETHYLENE ADIPAMIDE BY CARRYING OUT WATER REMOVAL STEP IN A FORMIC ACID VAPOR CONTAINING ATMOSPHERE

FIELD OF THE INVENTION

This invention relates to the preparation of polyamides. More particularly, the invention is directed to an improvement in that portion of the process for preparing polyamides from adipic acid where the initially polymerized polyamide is subjected to a water removal step to increase the molecular weight of the polyamide.

BACKGROUND OF THE INVENTION

In the continuous production of polyamides, a polyamide-forming composition is polymerized at amidation temperatures and pressures in a reactor vessel, and the molten polymer is ultimately passed to a finisher vessel where the molecular weight is increased by the removal of water at an elevated temperature and reduced pressure. During this extended, high-temperature heating in the finisher vessel, a reaction occurs in polyamides prepared from adipic acid that causes formation of intractable gel deposits in the processing equipment and formation of gel particles in the polymer melt. The gelation of molten polymer reduces the useful operating life of the finisher and requires periodic shut-down of the equipment for the removal of gel deposits. The gel particles in the polymer lead to the blinding (or plugging) of filter media and to the production of filamentary material of reduced quality.

It has now been discovered that the rate of gelation of molten polyamides can be reduced by finishing the molten polymer in an atmosphere containing formic acid vapors. Formic acid, of course, has been previously used in the preparation of polyamides, but not in the manner or in the step used in this invention. German Pat. No. 179,369 teaches, for example, that 3–20 percent by weight of formic acid can be added to polyamide-forming compositions to reduce diamine loss during polymerization. However, there is little, if any, diamine loss in a polymer finisher step, and the use of such excessive amounts of acid in this step would adversely affect molecular weight.

SUMMARY OF THE INVENTION

In the continuous process for preparing a polyamide from a polyamide-forming composition containing adipic acid wherein the composition is initially polymerized at amidation temperatures and pressures, and the molten polyamide obtained is ultimately passed to a finisher vessel where the molecular weight is increased by removing water from the polymerizate at temperatures of between about 250°C. and 320°C. and pressures of between about 25 mm. and 350 mm. of mercury, the improvement for reducing the rate of formation of gel deposits in the finisher vessel which comprises introducing formic acid into the atmosphere above the molten polyamide in the finisher and maintaining the formic acid vapor in such atmosphere at a concentration of between about 5 percent and about 25 percent by weight, based on the weight of the atmosphere.

BRIEF DESCRIPTION OF THE DRAWING

FIG. 1 is a schematic arrangement of apparatus which utilizes the principles of the present invention.

FIG. 2 is a schematic illustration of apparatus suitable for finishing the molten polyamides in the presence of formic acid vapors.

DESCRIPTION OF THE INVENTION

During the polymerization of polymeric adipamides, the polymer is subjected to a molecular-weight increasing step in a finisher vessel. During this step a gel forms and can collect on the inside walls of the vessel. In particular, the gel accumulates on the walls in the area of the polymer level in the vessel to form a ring at the interface. As the accumulation becomes severe, gel will slough off from its collection along said walls and will contaminate the polymer.

The formation of the gel in the finisher appears to involve the reaction of amine end groups with a cyclization product of the adipamide. Primary amine end groups are particularly susceptible to this reaction. It is theorized that the formic acid inhibits this reaction, and it has been found that if about 5–25 percent by weight of the atmosphere above the polymer in the finisher is formic acid, then the reaction is inhibited and gel formation is greatly reduced.

It is essential that the formic acid be present in the vapors above the polyamide. If the formic acid is simply added to the aqueous solution of the polyamide-forming salt, no significant reduction in the gelation rate occurs. Formic acid is unusual in that it can be added as a vapor during polymer finishing to reduce gelation without seriously affecting molecular weight, whereas other known organic acids appear to form more stabilized end groups with amine ends than does the formic acid and thus adversely affect molecular weight. At low formic acid vapor concentrations, e.g., about 10 percent in the finisher vessel atmosphere there is no significant reduction in the molecular weight that is obtained during polymer production, and, at relatively high vapor concentrations, the decrease in molecular weight is not severe. Because of the effect on molecular weight and because relatively high vapor concentrations do not reduce gelation proportionally it is preferred that the concentration of the formic acid vapors in the finisher atmosphere be from about 5 percent to about 15 percent by weight.

In producing polymeric adipamides in accordance with the present invention, it is preferred that the pressure of the atmosphere above the polymerizing polymer in the finisher be a low pressure, e.g., less than 350 millimeters of mercury and that the temperature be between 250°C. and 320°C. In practicing the invention, the formic acid preferably is to be added to a vacuum finisher. For an optimum result, it has been determined that with a polymer throughput of 4,500 pounds per hour, the formic acid should be added to the vacuum finisher at a rate of about 1 pound per hour. In such a system where polyhexamethylene adipamide having a relative viscosity of 30 is being finished to polymer havivng a relative viscosity of 67 by the removal of water at the rate of 11 pounds per hour, the concentration of the formic acid vapors in the atmosphere above the melt will be about 8.3 percent.

Referring now to the drawings for a detailed discussion of the process, the continuous polymerization system includes, in FIG. 1, a preliminary vessel 10 in which an aqueous polyamideforming salt solution (preferably a salt solution of hexamethylene diamine and adipic acid) is heated and may be partially polymerized at amidation pressures (between about 240 and 260 psig.) and temperatures (between about 230° and 250°C.); a reactor vessel 20 wherein polymerization is carried out at amidation temperatures with a reduction in pressure; a separator vessel 30; a finisher vessel 40 and a transfer pipe 71. The polymer may pass to other apparatus elements, e.g., a transfer pump, equilibrator, etc. not shown, and is subsequently transported to spinning heat 60. Concentration of the aqueous polyamide-forming salt solution fed to the system is adjusted by controlling the evaporation of an initial feed solution of less than 50 weight percent to the desired concentration in a conventional evaporator, not shown in the drawing.

The vessel 10 is a horizontal cylindrical vessel partitioned at 11 so that the reaction mass progresses through compartments without backmixing as it travels from the inlet to discharge end. The amide-forming salt solution from the evaporator is admitted through inlet pipe 12 and is heated by introduction of hot vapor to jacket 13. Such heating vaporizes the water of solution and initiates the polymerization reaction. The steam vapor is allowed to escape through pipe 14. Partially polymerized material is withdrawn from vessel 10 through outlet pipe 15 and forced by pump 16 into reactor 20.

Reactor 20 includes three sections 21, 22, and 23 of tubing which are connected in series and of successively increasing diameter. The tubes 21 to 23 are surrounded by a heating jacket 24, which receives heating fluid through inlet 25 and discharges it at 26. From the tube 23, the reaction products are passed to separator 30, through conduit 29.

Separator 30 comprises a vertical tubular column 31 into which reaction products from reactor 20 enter through conduit 29. Column 31 includes a pipe 32 and valve 33 for exhausting steam, which is disengaged from the molten polymer and a screw device 34, driven by shaft 35 and motor 36. Screw device 34 is designed to equalize the holding time of all portions of the polymer melt within this vessel, to squeeze steam bubbles out of the melt and to deliver bubble-free melt to finisher 40. The tubular column 31 is surrounded by heating jacket 37 which is supplied with a suitable heat transfer medium through pipe 38. The medium exits through pipe 39. The polymer then passes through pipe 70 to finisher 40.

Finisher 40 comprises vertical tubular column 41 with inlet conduit 70 and distribution head 42 for entry of polymer and division of the polymer into streams 43. Finisher 40 is operated at a pressure lower than that in steam separator 30 for exhausting steam which is disengaged from the polymer and exits through pipe 44 and valve 45. The separator will commonly be operated at a water vapor pressure of 1–3 psi. above atmospheric pressure while the finisher is under a partial vacuum, preferably a pressure of about 25–350 mm. of mercury. Screw device 46, driven by shaft 47 and motor 48 forwards the finished polymer from finisher 40 to transfer pipe 71. The tubular column 41 is surrounded by heating jacket 49 which is supplied with a suitable heat transfer medium through pipe 50. The medium exits through pipe 51. The formic acid vapors are preferably introduced into finisher 40 just above the polymer surface 54 through conduit 52 by way of valve 53. Alternatively, the formic acid may be added just below the molten polymer or just prior to the finisher 40 whereby all but a small amount will be flashed from the polymer and be present in the vapor in finisher 40. The polymer subsequently passes through pipe 71 to spinning head 60 which contains gear pump 61 by the aid of which the melt is extruded into filaments 62 through spinneret 63.

With reference to FIG. 2, steam containing formic acid vapors in a known concentration passes through pipe 80 in coupler 82 and inside pipe 84. Pipe 84 opens into a treating, or finisher, chamber formed by cap 86 and base 88 which contains tray 90. Tray 90 contains molten polyamide. If desired, tray 90 may be compartmented or more than one tray of an appropriate size can be placed on the bottom of base 88 in unstacked relationship. The finisher chamber is heated to the polymerization temperature in any suitable manner such as by immersion in a heated liquid bath. The formic acid vapors, provided by a boiling aqueous solution of formic acid of known concentration, exit from pipe 80 and enter the treating chamber where a molten polymeric adipamide is undergoing additional polymerization to increase the molecular weight. The formic acid vapors, which blanket the polymerizing mass, exit through pipe 84 where its walls converge in coupler 82 to the inside dimensions of pipe 92. After passing through pipe 92, the vapors can be condensed for recovery or passed from the system for suitable disposition.

EXAMPLE

The following example illustrates the effect of the concentration of formic acid vapors on the gelation rate of polyhexamethylene adipamide.

In an apparatus of the type shown in FIG. 2 are placed samples of polyhexamethylene adipamide having a relative viscosity of 54, and the samples polymerized in the presence of formic acid vapors at 280°C. for 30 minutes at a pressure of 76mm of mercury. Three circular trays having an inside diameter of 1.5 inches are used and each tray contains 5 grams of polymer. A sample of the polymer is removed and its relative viscosity determined. The relative viscosity is the ratio of the viscosity of a solution, containing 8.4 percent by weight, of the polymer in an aqueous formic acid solution containing 90 percent by weight formic acid, to the viscosity of the formic acid solution measured in the same units at 25°C. New samples are then placed in the trays and heated for a specified period of time with new samples being used for each heating period. The heating periods used are 1, 1.5, 2, 4, 8, 16 and 24 hours. The samples are tested for gel formation after heating using the procedure for preparing the solution used in the relative viscosity measurement. The first appearance of insoluble material is used to designate the gel time. If the sample is excessively gelled an intermediate heating period is used, for example, as in Run 6. The concentration of the formic acid is varied and the results from 6 runs are shown in the following Table.

TABLE

| Run | Vapor Composition %, By Weight, Formic Acid | Relative Viscosity | Time to Gel (Hrs.) |
|---|---|---|---|
| 1 | 0 | 110 | 8 |
| 2 | 7 | 115 | 16 |
| 3 | 10 | 100 | 16 |
| 4 | 15 | 70 | — |
| 5 | 20 | 65 | — |
| 6 | 25 | 65 | 20 |

As can be seen from the Table, using up to 10 percent formic acid, the relative viscosity of the polymeric adipamide is essentially doubled while increasing the time of gel to about twice that obtained without the use of formic acid vapors.

The preceding representative example may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiment of the invention in which an exclusive property of privilege is claimed are defined as follows:

1. In the continuous process for preparing a fiber forming polyamide from a polyamide-forming composition comprised of adipic acid and hexamethylene diamine wherein the composition is initially polymerized at amidation temperatures and pressures, and the molten polyamide obtained is ultimately passed to a finisher vessel where the molecular weight is increased by removing water from the polymerizate at temperatures of between about 250°C. and 320°C. and pressures of between about 25 mm. and 350 mm. of mercury, the improvement for reducing the rate of formation of gel deposits in the finisher vessel which comprises introducing formic acid into the atmosphere above the molten polyamide in the finisher and maintaining the formic acid in such atmosphere at a concentration of between about 5 percent and about 25 percent by weight, based on the weight of the atmosphere.

2. The process of claim 1 wherein the formic acid is present in an amount between 5 percent and 15 percent by weight.

* * * * *